United States Patent [19]

Estes et al.

[11] 4,222,439

[45] Sep. 16, 1980

[54] ENHANCED RECOVERY OF PETROLEUM

[75] Inventors: John H. Estes, Wappingers Falls; Ernest P. Buinicky, Newburgh, both of N.Y.

[73] Assignee: Texaco Inc., White Plains, N.J.

[21] Appl. No.: 931,693

[22] Filed: Aug. 7, 1978

[51] Int. Cl.² ............................................. E21B 43/24
[52] U.S. Cl. .................................. 166/272; 166/273; 166/274; 166/302; 166/303
[58] Field of Search ............... 166/272, 273, 274, 275, 166/302, 303, 305 R

[56] References Cited

U.S. PATENT DOCUMENTS

| 3,042,114 | 7/1962 | Willman | 166/272 |
|---|---|---|---|
| 3,258,072 | 6/1966 | Froning | 166/275 X |
| 3,343,601 | 9/1967 | Pye | 166/275 X |
| 3,357,487 | 12/1967 | Gilchrist et al. | 166/272 X |
| 3,360,043 | 12/1967 | Braden, Jr. et al. | 166/272 |
| 3,385,359 | 5/1968 | Offeringa | 166/272 X |
| 3,428,120 | 2/1969 | Metler | 166/275 X |
| 4,078,608 | 3/1978 | Allen et al. | 166/272 X |

*Primary Examiner*—Stephen J. Novosad
*Assistant Examiner*—George A. Suchfield
*Attorney, Agent, or Firm*—Carl G. Ries; Robert A. Kulason; Gregory A. Cone

[57] ABSTRACT

An Enhanced Oil recovery method comprising injecting an aqueous ammonium bisulfite ($NH_4HSO_3$) solution into a petroleum-bearing earth formation, heating said injected aqueous solution to a temperature in the range of about 120°–300° F., or higher in the presence of said petroleum-bearing earth formation, flowing said aqueous solution through said petroleum bearing earth formation to drive petroleum to a recovery well, and producing increased amounts of petroleum from said earth formation through said recovery well.

11 Claims, No Drawings

ENHANCED RECOVERY OF PETROLEUM

BACKGROUND OF THE INVENTION

This invention relates to methods for recovering oil from a petroleum bearing earth formation by injecting fluids to flush oil from the pores of said earth formation and recover such oil at one or more recovery wells. More particularly, this invention relates to improved flooding processes for recovery of petroleum employing aqueous solutions of ammonium bisulfite ($NH_4HSO_3$) as flooding medium, or as constituents thereof. According to the invention, aqueous solutions of ammonium bisulfite may be injected into a petroleum bearing earth formation as a bank of primary drive medium at ambient temperatures above the freezing point of said solution and below about 120° F. Within the earth formation the aqueous ammonium bisulfite solution may be heated by direct exchange with the earth formation, or by other means such as steam injection, to a temperature in the range of about 120°–300° F., or higher to provide an agent for driving oil from said earth formation to a recovery well.

For enhanced recovery of oil from petroleum bearing earth formations, it has become conventional practice to use a drive fluid under pressure to sweep oil remaining in said earth formation to a recovery well after primary production by gas drive, water drive or pumping has become uneconomical. Such sweep techniques may also be practiced early in the life of an oil field to maintain earth formation pressure. Normally for such enhanced recovery techniques one or more boreholes drilled into said earth formation are employed as injection wells and one or more boreholes, drilled into said earth formation at pre-determined determined spacings from said injection wells, are employed as recovery wells. Sweep fluid, selected from oil miscible fluids, oil immiscible fluids, and combinations thereof, is injected into the injection wells and forms a bank of primary drive agent. The primary drive agent is then pressured through the earth formation, by injection of additional fluid, toward the recovery well or wells. Oil displaced from the earth formation by the sweep fluid is then produced from the recovery well or wells.

Oil recovery from subterranean formations is limited in enhanced recovery processes employing immiscible drive fluids, such as water and/or brines. Capillary forces and surface tension phenomena within rock pores of the subterranean formations prevent recovery of more than a fraction of the oil in place.

Use of a bank of primary drive agent miscible with the petroleum improves recovery of oil. Preferably in such processes oil miscible primary drive agent, such as liquefied hydrocarbon gases, carbon dioxide, etc. is injected into the oil-containing earth formation to form a bank of primary drive fluid. This primary drive fluid is pressured through the formation toward a recovery well by a backing drive fluid such as water, steam, additional gases, etc. The injection of primary drive agent is generally restricted in volume due to cost of liquids miscible with oil. The cost of enhanced recovery processes using oil miscible drive agents coupled with the relatively low value of additional oil recovered as a consequence serves to make such processes expensive, and not altogether successful, considering the amount of unrecovered oil remaining in subterranean formations after such recovery efforts.

Processes for enhanced recovery of oil from subterranean formations employing liquid sulfur dioxide, or aqueous solutions of sulfur dioxide as primary drive agent have been disclosed. For example see U.S. Pat. Nos. 3,353,597 and 3,326,289. Although such processes disclose improved recovery of oil, the disadvantages of handling a poisonous volatile, corrosive material such as sulfur dioxide are considerable.

SUMMARY OF THE INVENTION

Now, according to the method of the present invention we have discovered an improved process for recovery of oil from subterranean oil-bearing formations employing a primary drive fluid comprising an aqueous solution of ammonium bisulfite.

In a preferred embodiment of the present invention a liquid aqueous ammonium bisulfite solution, comprising from about 0.01 to about 1.0 moles/litre ammonium bisulfite dissolved in water or brine, at a temperature preferably below about 120° F. is injected, via an injection well, into an oil containing subterranean formation. In the formation the ammonium bisulfite solution is heated, by direct heat exchange with the subterranean formation or by an external source such as steam injection, to a temperature above about 120° F., and preferably in the range of from about 200°–300° F. The heated ammonium bisulfite solution is pressured, by injection of additional fluid via the injection well, through the subterranean formation toward a recovery well. Additional oil, over that producible from the subterranean formation by primary production techniques is recovered from the recovery well.

In a second embodiment of the present invention the heated ammonium bisulfite solution is pressured into the subterranean formation from an injection well employing an injection fluid. After a time, pressure on the injection well is reduced such that petroleum from the subterranean formation flows into the injection well, from which the petroleum is produced to the surface.

Advantages of the present invention include increased oil recovery from subterranean formations, employing an economical drive fluid, e.g. aqueous ammonium bisulfite. Preparation of the drive fluid does not require handling of danageous volatile, corrosive chemicals, as the ammonium bisulfite may be mixed as a solid into an aqueous solvent such as water or brine. Corrosion of well casing and associated piping by acid attack is substantially reduced, even at high temperatures, as the ammonium ions present in the aqueous solution tend to neutralize acids. These and other advantages of the present invention are discussed in the detailed description which follows.

DETAILED DESCRIPTION OF THE INVENTION

Aqueous solutions of ammonium bisulfite have been found to be surprisingly effective as a drive agent for displacing additional oil from petroleum bearing earth formations at temperatures above 120° F. No theory explaining the effectiveness of such ammonium bisulfite in displacing oil from earth formations is formulated herein. However, it is noted that ammonium bisulfite in aqueous solution disassociates at temperatures above about 120° F.

Effective concentrations of ammonium bisulfite in such aqueous solutions are in the range of from about 0.01 molar to the saturation concentration at injection conditions. Ammonium bisulfite concentrations in such aqueous solutions of about 0.1 molar are preferred.

Aqueous solvent for dissolving ammonium bisulfite may comprise water or brine. The water may be from any convenient source, such as surface water, well water, etc., and the brine may be connate water recovered from the same or other subterranean formations from which the oil is to be produced.

Subterranean formations in which the aqueous ammonium bisulfite solutions of the present invention may be employed are those oil bearing formations having porosity and permeability sufficient to allow injection of said aqueous solutions and subsequent recovery of displaced oil. Such formations may comprise silica and/or carbonate rock, such as limestone, sandstone, dolomite, chalk, unconsolidated sand, etc.

According to the present invention, an aqueous liquid solution of ammonium bisulfite is injected into an oil bearing earth formation through one or more injection wells, preferably at a temperature less than about 120° F. At temperatures below 120° F., the aqueous ammonium bisulfite solution is stable and not particularly corrosive, thus is easily handled without special equipment or procedure.

Concentration of ammonium bisulfite in said solution is within the range of about 0.01 to about 1.0 moles/litre, and preferably about 0.1 moles/liter. The aqueous solvent is preferably selected from water or brine, and may contain other additives, such as surface active agents, oil soluble components, thickening agents etc., which do not adversly affect the action of the ammonium bisulfite for enhanced recovery of oil from the oil bearing earth formation. At ammonium bisulfite concentrations below about 0.01 moles/liter, the solution does not substantially enhance petroleum recovery. At concentrations above about 1.0 moles per liter, the solution is approaching its saturation concentration.

Within the earth formation, the ammonium bisulfite solution is heated to a temperature above about 120° F. preferably about 200°-300° F. In the case where the earth formation is hot, the ammonium bisulfite solution may be heated by direct heat exchange with the hot earth formation. In other cases, wherein the earth formation is not sufficiently hot, the ammonium bisulfite may be heated by injection of hot fluids such as steam, hot water, combustion gases, etc. In appropriate cases, the ammonium bisulfite may be heated by in situ combustion of a portion of the hydrocarbons in place within the earth formation. Maximum temperature of the injected ammonium bisulfite solution should be maintained below the boiling point, at formation pressure, to ensure presence of a liquid solution for enhancing oil recovery.

The hot ammonium bisulfite solution is forced through the earth formation by injection of a drive fluid into the earth formation via the injection well. The drive fluid may be additional ammonium bisulfite solution, or it may be the same fluid employed for heating the ammonium bisulfite, e.g. steam, hot water, air, etc. In cases where the ammonium bisulfite solution is maintained at a selected temperature above 120° F., by direct heat transfer from the earth formation, the drive fluid may be selected from other fluids such as carbon dioxide, light hydrocarbon gases, water, brine, etc. The drive fluid forces the ammonium bisulfite solution into the earth formation wherein the ammonium bisulfite solution acts to displace oil from the pores and interstitial spaces of the earth formation.

In a preferred embodiment of the present invention, the oil displaced by the ammonium bisulfite solution is moved through the earth formation to a recovery well, from which the displaced oil is produced to the surface. Production of oil in this manner is continued until such production is no longer economically justified.

In a second embodiment of the present invention, ammonium bisulfite solution is driven into the earth formation, under pressure, from the injection well for a period of time, displacing oil from the pores and interstitial spaces of the earth formation. At the end of the time period, pressure upon the injection well is relieved, and petroleum in admixture with injected fluids is produced from the injection well. This process may be repeated until the production rate of petroleum is no longer economically justified.

Within an earth formation, at temperatures above about 120° F., ammonium bisulfite tends to disassociate (into ammonia and sulfur dioxide) and/or react with components of the earth formation. Although the mechanism by which aqueous ammonium bisulfite enhances oil recovery is not understood, it is noted that ammonia is an effective emulsifying agent for water and oil. Also, it is noted that carbon dioxide, which is a product of the reaction of sulfur dioxide with carbonate minerals, is oil soluble, results in swelling and viscosity reduction of the oil, and is known to be a useful agent for enhanced oil recovery. Although we do not wish to be bound by any theory of the mechanism by which aqueous ammonium bisulfite serves to enhance petroleum recovery from earth formations, the properties of ammonia and carbon dioxide, which may be present at elevated temperatures, suggests that they would serve for such enhanced recovery.

The volume of aqueous ammonium bisulfite injected is preferably at least a substantial fraction of the pore volume to be swept by the drive fluid. That is, volumes of aqueous ammonium bisulfite equivalent to about 0.5 to about 10 pore volumes of the earth formation are preferred. A volume of aqueous ammonium bisulfite will be used to produce an advancing bank in the earth formation of at least one foot in thickness. At lesser volumes, the amount of additional oil produced will not economically justify the expense of injecting and pressuring the drive fluids through the earth formation.

EXAMPLE

In order to demonstrate the effectiveness of the present invention, the following experiment was performed.

A quartz sand was screened to provide a sand mixture having the following size distribution:

| SAND SIZE DISTRIBUTION | |
|---|---|
| Tyler Mesh | WT. % |
| 40–60 | 43 |
| 60–100 | 37 |
| 100–200 | 11 |
| 120–200 | 6 |
| 200+ | 3 |

This sand mixture was then heated to 1000° F. for four hours.

A Sand core was prepared by adding the heat-treated sand to a core tube filled approximately half full of water. The sand was compacted by tapping the tube, after which excess water was drained. Metal fittings, with glasswool plugs were connected to the ends of the core tube for confining the packed sand.

The sand-packed core tube was mounted vertically with appropriate connections for injecting and recovering fluids, measuring pressure, etc. Brine was pumped downflow through the sand-pack in the core tube such that the sandpack pore volume was filled before emplacement of crude oil.

Arabian light crude oil was pumped upflow through the brine-wet sand pack in an amount equivalent to more than twice the sand volume, for displacing brine and emplacing crude oil in the sand pack. The volume of brine displaced was employed to compute the pore volumes in the sand pack, which amounted to 37 percent of the total sand-pack volume.

The oil-saturated sand pack was then flooded with fresh water in an amount equivalent to 5 times the volume of the sand-pack (13.5 times the void volume) for displacing oil from the sand-pack. At the end of the water flooding operation, the sand pack contained 10 weight percent unrecovered oil.

According to the method of the present invention, the sand-pack, after waterflooding, comprising 200 gm. sand containing 20 grams of undisplaced oil, was flooded with a 0.1 molar solution of ammonium bisulfite in water. The ammonium bisulfite solution was pumped through the sand-pack against a back pressure of 300 psig, at a temperature of 300° F., and at a rate of 250 ml/hr. Upon pumping 1000 ml of ammonium bisulfite solution (equivalent to 13.5 times the pore volume of the sand pack), recovered oil from the sand pack amounted to 18 gms (90% recovery).

Thus, it can be seen that by employing the improved recovery process of the present invention, that a major portion (90%) of oil remaining in place after enhanced recovery by water flood may be recovered employing an aqueous ammonium bisulfite solution flood.

From the above description and example many variations and modifications of the present invention will be apparent to those skilled in the art, which are within the spirit and scope of the present invention. Therefore, the present invention is intended to be limited only as indicated in the appended claims.

We claim:

1. In the recovery of petroleum oil from an earth formation penetrated by at least one injection well and by at least one recovery well spaced therefrom, the method which comprises:
   (a) injecting, via said injection well, an aqueous ammonium bisulfite solution of a temperature less than about 120° F. into said earth formation;
   (b) heating said injected aqueous ammonium bisulfite solution to a temperature above about 120° F.;
   (c) driving said heated aqueous ammonium bisulfite solution from said injection well toward said production well for displacing petroleum oil from said earth formation; and
   (d) producing said displaced petroleum oil from said recovery well.

2. The method of claim 1 wherein said aqueous ammonium bisulfite solution comprises from about 0.01 to about 1.0 moles ammonium bisulfite per liter of solution.

3. The method of claim 2 wherein said injected ammonium bisulfite solution is heated to a temperature in the range of about 200°-300° F.

4. The method of claim 1 wherein said aqueous ammonium bisulfite solution comprises from about 0.01 to about 1.0 moles ammonium bisulfite per liter of solvent selected from the group consisting of water and brine.

5. The method of claim 4 wherein said injected aqueous ammonium bisulfite is heated by injection of a hot drive fluid into said earth formation via said injection well.

6. The method of claim 5 wherein ammonium bisulfite concentration in said solution is about 0.1 moles/liter and wherein said injected ammonium bisulfite solution is heated to about 200°-300° F.

7. The method of claim 4 wherein said injected ammonium bisulfite solution is heated by direct heat exchange with said earth formation.

8. The method of claim 7 wherein said injected ammonium bisulfite solution is driven through said earth formation by injection of a drive fluid via said injection well.

9. The method of claim 8 wherein ammonium bisulfite concentration in said solution is about 0.1 moles/liter.

10. In the recovery of petroleum oil from an earth formation penetrated by at least one injection well, the method which comprises:
    (a) injecting, via said injection well, an aqueous ammonium bisulfite solution of a temperature less than about 120° F. into said earth formation;
    (b) heating said injected aqueous ammonium bisulfite solution to a temperature above about 120° F.;
    (c) injecting a drive fluid, at an elevated pressure, into said injection well for driving said ammonium bisulfite solution into said earth formation and displacing oil from the pores and interstitial spaces of said earth formation;
    (d) relieving pressure on said injection well such that displaced oil, ammonium bislufite solution and other injected fluids flow from said earth formation to said injection well; and
    (e) producing petroleum from said injection well.

11. The method of claim 10 wherein ammonium bisulfite solution comprises from about 0.01 to about 1.0 moles ammonium bisulfite per liter of a solvent selected from the group consisting of water and brine, and wherein said ammonium bisulfite solution is heated to a temperature in the range of about 200°-300° F.

* * * * *